(12) United States Patent
Schmitt et al.

(10) Patent No.: US 8,168,736 B2
(45) Date of Patent: *May 1, 2012

(54) EMULSION POLYMER COMPRISING ACTIVATORS, PROCESS FOR PREPARATION THEREOF AND USE THEREOF IN TWO-COMPONENT OR MULTICOMPONENT SYSTEMS

(75) Inventors: Gerold Schmitt, Aschaffenburg (DE); Wolfgang Klesse, Mainz (DE); Joachim Knebel, Alsbach-Haehnlein (DE)

(73) Assignee: Evonik Röhm GmbH, Darmstadt (DE)

( * ) Notice: Subject to any disclaimer, the term of this patent is extended or adjusted under 35 U.S.C. 154(b) by 131 days.

This patent is subject to a terminal disclaimer.

(21) Appl. No.: 12/668,450

(22) PCT Filed: Jun. 27, 2008

(86) PCT No.: PCT/EP2008/058223
§ 371 (c)(1),
(2), (4) Date: Jan. 11, 2010

(87) PCT Pub. No.: WO2009/007254
PCT Pub. Date: Jan. 15, 2009

(65) Prior Publication Data
US 2010/0174028 A1 Jul. 8, 2010

(30) Foreign Application Priority Data

Jul. 12, 2007 (DE) .......................... 10 2007 032 836

(51) Int. Cl.
*C08F 220/10* (2006.01)

(52) U.S. Cl. ...................... 526/329.2; 526/319; 526/326; 526/328; 526/328.5; 526/329.7; 526/310

(58) Field of Classification Search ................. 526/319, 526/326, 328, 328.5, 329.2, 329.7, 310
See application file for complete search history.

(56) References Cited

U.S. PATENT DOCUMENTS

| | | | |
|---|---|---|---|
| 3,886,116 A | 5/1975 | Parks | |
| 7,659,324 B2 * | 2/2010 | Moszner et al. | 522/183 |
| 2006/0293451 A1 | 12/2006 | Schmitt et al. | |

FOREIGN PATENT DOCUMENTS

| | | |
|---|---|---|
| DE | 2 361 501 | 5/1974 |
| DE | 103 39 329 | 3/2005 |
| GB | 1415059 | * 11/1975 |
| GB | 1415060 | * 11/1975 |
| JP | 58 170737 | 10/1983 |

OTHER PUBLICATIONS

Dnebosky, J. et al., "Polymerizable Amines as Promoters of Cold-Curing Resins and Composites", J. Dent. Res., vol. 54, No. 4, pp. 772-776, XP002499007, (1975).

* cited by examiner

*Primary Examiner* — David W Wu
*Assistant Examiner* — Vu A Nguyen
(74) *Attorney, Agent, or Firm* — Oblon, Spivak, McClelland, Maier & Neustadt, L.L.P.

(57) ABSTRACT

The invention describes an
emulsion polymer which can be obtained by polymerization of a mixture comprising
a) from 5 to 99.9% by weight of one or more monomers having a solubility in water of <2% by weight at 20° C. and selected from the group consisting of monofunctional (meth)acrylate monomers, styrene and vinyl esters;
b) from 0 to 70% by weight of one or more monomers which can be copolymerized with the monomers a);
c) from 0 to 20% by weight of one or more doubly or multiply vinylically unsaturated compounds;
d) from 0 to 20% by weight of one or more polar monomers having a solubility in water of >2% by weight at 20° C.; and
e) 0.1-95% by weight of at least one activator,
with the components a) to e) adding up to 100% by weight of the polymerizable constituents of the mixture, and is characterized in that
e1) the activator is a compound of the Formula I,

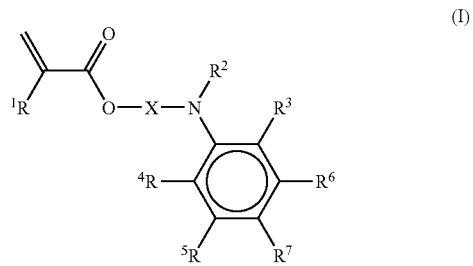

where the radicals $R^1$ to $R^7$ and X have the meanings given in the description; and in that
e2) the activator e) is incorporated via covalent bonds into the emulsion polymer. The emulsion polymer makes it possible to form core-shell polymers having a protected activator fixed to the polymer and can be used particularly advantageously for controlling the pot life of two-component or multicomponent systems, for example in adhesives, pourable resins, floor coatings, compositions for reactive pegs, dental compositions or sealing compositions.

8 Claims, No Drawings

EMULSION POLYMER COMPRISING ACTIVATORS, PROCESS FOR PREPARATION THEREOF AND USE THEREOF IN TWO-COMPONENT OR MULTICOMPONENT SYSTEMS

1. FIELD OF THE INVENTION

The invention describes an emulsion polymer having activators fixed to it and also a process for preparing it. The invention also relates to a two-component or multicomponent system which comprises the emulsion polymer having an activator fixed to it and an ethylenically unsaturated monomer or a monomer mixture of ethylenically unsaturated monomers which cures by means of a redox initiator system and has a controllable pot life, with both the emulsion polymer and the monomer or the monomer mixture being able to contain one of the components of a redox initiator system. Finally, the invention also relates to the use of the two-component or multicomponent systems.

2. PRIOR ART

Two-component systems which are based on free-radically polymerizable monomers and cure by redox initiation have been known for a long time. In general, a liquid monomer or monomer mixture, which may contain a redox component, is admixed before use with the missing redox system components or all redox system components.

In addition, systems which additionally contain a polymer dissolved in the monomer or monomer mixture have been described. Furthermore, systems in which liquid monomer, a bead polymer and a redox initiator system are mixed to form a highly viscous composition before use are known, especially from dental applications.

Among many publications on the subject, mention may be made by way of example of DE 43 15 788, DE 15 44 924 and DE 27 10 548. All these systems have the inherent disadvantage that the time available for processing after mixing of the components (pot life) is limited or that energy has to be introduced, for example in the form of milling and frictional forces, when the systems are used. Although the pot life can be increased to a certain extent by reducing the concentration of redox components, this is subject to limits since curing is adversely affected as the concentration of redox components drops. A further disadvantage of the formulations from the prior art is that the maximum workplace concentrations (MAC values) of volatile monomers, for example methyl methacrylate, can be exceeded. This disadvantage in use can be countered only to a limited extent by the use of less volatile monomers, since the bead polymers which are, for example, frequently used cannot be swelled at a sufficient rate by less volatile monomers. Furthermore, inhibition of the polymerization by oxygen is more pronounced when less volatile monomers are employed than when methyl methacrylate is used.

DE 100 51 762 provides monomer-polymer systems based on aqueous dispersions which not only have good mechanical properties but offer the advantage that they emit no monomers or only a very small amount of monomers and are also simple to handle and have a high storage stability. For this purpose, mixtures of aqueous dispersions whose particles have been swollen by means of an ethylenically unsaturated monomer which in each case contains one of the redox components are used. These swollen aqueous systems have virtually unlimited storage stability and cure only after evaporation of the water and subsequent film formation. The disadvantage of these systems is that curing by the required evaporation of the water takes a long time, particularly in the case of relatively thick layers, and large amounts of water interfere in a series of applications, e.g. reactive adhesives.

WO 99/15592 describes reactive plastisols which after thermal gelling and curing lead to films having good mechanical properties. These plastisols comprise a known base polymer, preferably in the form of a spray-dried emulsion polymer, a reactive monomer component comprising at least one monofunctional (meth)acrylate monomer, a plasticizer and, if appropriate, further crosslinking monomers, fillers, pigments and auxiliaries. The base polymer can have a core/shell structure and contain 0-20% of polar comonomers. The plastisols are storage stable for weeks and have to be heated to high temperatures (e.g. 130° C.) in order to form a film.

DE 103 39 329 A1 describes a two-component system which comprises an emulsion polymer or a plurality of emulsion polymers and an ethylenically unsaturated monomer or a monomer mixture of ethylenically unsaturated monomers and cures by means of a redox initiator system and has a controllable pot life, with both the emulsion polymer and the monomer or the monomer mixture being able to contain one of the components of a redox initiator system. The control of the pot life is achieved by absorption of at least one of the components of the redox initiator system on the polymer. Here, the low molecular weight initiator component is physically encapsulated in polymer particles which are produced by emulsion polymerization. When the encapsulated polymer comes into contact with monomer when the two-component system is used, the polymer swells, the formerly encapsulated and/or absorbed initiator component is liberated and can produce its action. Although this "encapsulation" of a component of the initiator system in the polymer allows a very advantageous and variable control of the pot life, such regulation is still capable of improvement in some respects. One of these is reliability in use. Due to superimposition, the concentration of the component encapsulated in the polymer can, for example, drop, for instance by migration. As a result, the reactivity of the system may deviate from the intended values.

On the other hand, it is intrinsically difficult to achieve a high loading of the polymer with the encapsulated component in the system described in DE 103 39 329 A1. In practice, relatively high loadings, e.g. 5% or more, produce effects which point to incomplete inclusion of the activator. However, it can be the case that particularly reactive systems are required, so that a very high loading of sometimes up to 40% (ww) or even higher (>40% [w/w]) is desired.

Finally, long-term reliability of the degree of loading has to be ensured even at and especially at a high loading.

3. OBJECT

In view of the prior art mentioned and discussed above, it was an object of the invention to provide two-component or multicomponent systems which cure at room temperature and whose pot life can be adjusted within wide limits and which nevertheless cure quickly and completely at a defined point in time without introduction of energy or external mechanical impulse.

A further object was to achieve complete curing even in thin layers without exclusion of air.

A further object of the invention was to minimize odour pollution and to keep the concentration of monomers in the air below the limits applicable to the respective monomer during use.

A further object was to make wide variation of the activator concentration possible.

Furthermore, the pot life should be made independent of the time for which the two-component or multicomponent system is stored. Thus, pot lives are frequently set by means of a particular concentration of inhibitors. After prolonged storage under unfavourable conditions, the inhibitors can be partly consumed, so that the pot life is shorter than desired.

It was also an object of the invention, inter alia, to provide a system which can satisfy all of the abovementioned range of properties and is nevertheless simple and safe to handle.

Finally, the invention should also provide the polymers necessary as intermediates for providing this system and also provide a process for preparing them.

An indication of uses for the system of the invention was also to be given.

4. ACHIEVEMENT OF THE OBJECTS

The objects of the invention or subaspects of the objects of the invention are achieved by a novel emulsion polymer which can be obtained by polymerization of a mixture comprising
- a) from 5 to 99.9% by weight of one or more monomers having a solubility in water of <2% by weight at 20° C. and selected from the group consisting of monofunctional (meth)acrylate monomers, styrene and vinyl esters;
- b) from 0 to 70% by weight of one or more monomers which can be copolymerized with the monomers a);
- c) from 0 to 20% by weight of one or more doubly or multiply vinylically unsaturated compounds;
- d) from 0 to 20% by weight of one or more polar monomers having a solubility in water of >2% by weight at 20° C.; and
- e) 0.1-95% by weight of at least one activator, with the components a) to e) adding up to 100% by weight of the polymerizable constituents of the mixture, where the emulsion polymer is characterized in that
e1) the activator is a compound of the Formula I,

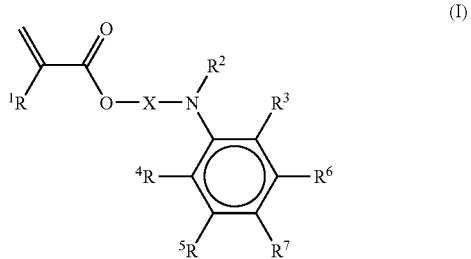

where
$R^1$ is hydrogen or methyl;
X is a linear or branched alkanediyl group which has from 1 to 18 carbon atoms and may be monosubstituted or polysubstituted by hydroxyl groups and/or by $C_1$-$C_4$ alkoxy groups;
$R^2$ is hydrogen or a linear or branched alkyl radical which has from 1 to 12 carbon atoms and may be monosubstituted or polysubstituted by hydroxyl groups or $C_1$-$C_4$-alkoxy groups, with the hydroxyl groups in $R^2$ being able to be partially esterified with (meth)acrylic acid;
$R^3$, $R^4$, $R^5$, $R^6$ and $R^7$ are each, independently of one another, hydrogen or a linear or branched alkyl or alkoxy group which has from 1 to 8 carbon atoms and can be monosubstituted or polysubstituted by hydroxyl groups, where two of the radicals $R^3$ to $R^7$ may be joined to one another to form a five- to seven-membered ring and may form a fused aromatic ring system with the phenyl radical; and in that
e2) the activator e) is covalently bound to the emulsion polymer.

Such an emulsion polymer as intermediate allows the creation of extremely advantageous two-component or multicomponent systems which cure by means of a redox initiator system and have a controllable pot life.

In the context of this system, the objects of the invention are achieved especially by a two-component or multicomponent system comprising
A) 0.8-69.94% by weight of an emulsion polymer according to the invention;
B) 30-99.14% by weight of one or more ethylenically unsaturated monomers;
C) 0.05-10% by weight of peroxides; if appropriate
D) 0-60% by weight of oligomers or polymers;
E) 0.01-2% by weight of a polymerization inhibitor; and, if appropriate,
F) 0-800 parts by weight of auxiliaries and additives;
with the sum of the constituents A)+B)+C)+D)+E) being 100% by weight and the amount of F) being based on 100 parts by weight of the sum of A)+B)+C)+D)+E). In general, the components B), D), E) and F) are present as a storable mixture, while the components A) and C) are mixed into this mixture before use.

Two-component or multicomponent systems according to the invention can be used with great advantage in adhesives, pourable resins, floor coatings, compositions for reactive pegs, dental compositions or in sealing compositions.

The compositions of the invention allow a broad range of concentration of the activator (range of variation) to be realized.

A particular advantage is that at high activator concentrations in component A, less of A has to be mixed into the two-component or multicomponent system before use. The possibility of varying the reactivity is also advantageous. At a constant amount of component A added, the reactivity can be varied by means of various concentrations of the activator in A.

5. DETAILED DESCRIPTION OF THE INVENTION

The Emulsion Polymer=Component A

Component A can be obtained by polymerization of a mixture comprising
- a) from 5 to 99.9% by weight of one or more monomers having a solubility in water of <2% by weight at 20° C. and selected from the group consisting of monofunctional (meth)acrylate monomers, styrene and vinyl esters;
- b) from 0 to 70% by weight of one or more monomers which can be copolymerized with the monomers a);
- c) from 0 to 20% by weight of one or more doubly or multiply vinylically unsaturated compounds;
- d) from 0 to 20% by weight of one or more polar monomers having a solubility in water of >2% by weight at 20° C.; and
- e) 0.1-95% by weight of at least one activator, with the constituents a) to e) adding up to 100% by weight of the polymerizable constituents of the mixture, resulting in the emulsion polymer=component A, where e1) the activator is a compound of the Formula I,

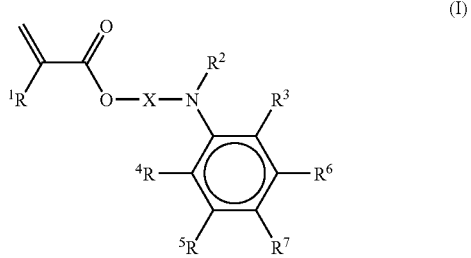

where
- $R^1$ is hydrogen or methyl;
- X is a linear or branched alkanediyl group which has from 1 to 18 carbon atoms and may be monosubstituted or polysubstituted by hydroxyl groups and/or by $C_1$-$C_4$ alkoxy groups;
- $R^2$ is hydrogen or a linear or branched alkyl radical which has from 1 to 12 carbon atoms and may be monosubstituted or polysubstituted by hydroxyl groups or $C_1$-$C_4$-alkoxy groups;
- $R^3$, $R^4$, $R^5$, $R^6$ and $R^7$ are each, independently of one another, hydrogen or a linear or branched alkyl or alkoxy group which has from 1 to 8 carbon atoms and can be monosubstituted or polysubstituted by hydroxyl groups, where the hydroxyl groups can be partially esterified by (meth)acrylic acid; and two of the radicals $R^3$ to $R^7$ may be joined to one another to form a five- to seven-membered ring and may form a fused aromatic ring system with the phenyl radical;

and
e2) the activator e) is covalently built into the emulsion polymer.

The notation (meth)acrylate, both here and in the total context of the invention, refers to both methacrylate, e.g. methyl methacrylate, ethyl methacrylate, etc., and acrylate, e.g. methyl acrylate, ethyl acrylate, etc., and also mixtures of the two.

The emulsion polymer=component A) is preferably made up essentially of (meth)acrylate monomers and styrene and/or styrene derivatives and/or vinyl esters.

It is particularly preferably made up of at least 80% of methacrylate and acrylate monomers, very particularly preferably exclusively methacrylate and acrylate monomers.

Component A a)

Examples of monofunctional methacrylate and acrylate monomers having a solubility in water of <2% by weight at 20° C. are methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, hexyl (meth)acrylate, ethylhexyl (meth)acrylate, isodecyl methacrylate, lauryl methacrylate, cyclohexyl (meth)acrylate, tetrahydrofurfuryl (meth)acrylate, isobornyl (meth)acrylate, benzyl (meth)acrylate, phenyl (meth)acrylate, phenylethyl (meth)acrylate, 3,3,5-trimethylcyclohexyl (meth)acrylate. Methods of determining the solubility of organic compounds in water are well known to those skilled in the art.

For the purposes of the present invention, styrene derivatives are, for example, α-methylstyrene, chlorostyrene or p-methylstyrene. Examples of vinyl esters are vinyl acetate and relatively long-chain derivatives such as vinyl versatate.

Preference is given to incorporating methacrylate monomers, in particular methyl methacrylate, to achieve a high glass transition temperature and methacrylates having >4 carbon atoms in the side chain and acrylates to reduce the glass transition temperature. The monomers are advantageously combined so that a glass transition temperature above 60° C., preferably above 80° C. and in particular above 100° C., results if the emulsion polymer A is to be isolated by drying. The glass transition temperatures are measured in accordance with EN ISO 11357. If the emulsion polymer A is to be added as an aqueous dispersion to the two-component or multicomponent system, the glass transition temperature can be lower. To obtain a sufficiently high swelling resistance to the monomers B, a glass transition temperature above room temperature is usually advantageous. It is preferably above 30° C., particularly preferably above 40° C., in particular above 60° C.

This does not mean that glass transition temperatures above room temperature may not be advantageous in particular cases. This can be the case when, for example, the solvent capability of the monomers used for component B is low so that swelling takes too long.

If the glass transition temperatures of homopolymers are known, the glass transition temperatures of the copolymers can be calculated to a first approximation by the formula of Fox:

$$\frac{1}{T_g} = \frac{w_A}{T_{gA}} + \frac{w_B}{T_{gB}} + \frac{w_C}{T_{gC}} + \dots$$

In this equation: $T_g$ is the glass transition temperature of the copolymer (in K), $T_{gA}$, $T_{gB}$, $T_{gC}$, etc., are the glass transition temperatures of the homopolymers of the monomers A, B, C etc., (in K), and $w_A$, $w_B$, $w_C$ etc., are the mass fractions of the monomers A, B, C, etc., in the polymer.

The higher the glass transition temperature of the polymer, the greater the resistance to swelling by the monomers added before use and thus the pot life. Likewise, an increasing molar mass increases the swelling resistance.

In this respect, particularly preferred polymers are characterized in that a) comprises one or more methacrylate monomers and/or acrylate monomers. a) is very particularly advantageously methyl methacrylate.

Component A b)

Examples of component A b) are maleic anhydride, itaconic anhydride and esters of itaconic and maleic acids. Their proportion in the emulsion polymer can be up to 70% by weight, with preference being given to 0-30% by weight, in particular 0-10% by weight. Very particular preference is given to omitting component A b).

Component A c)

The incorporation of relatively high proportions of doubly and/or multiply unsaturated monomers (crosslinkers) restricts the achievable degree of swelling in the formulation and can lead to an inhomogeneous polymer at the nanoscale level. This does not have to be disadvantageous in every case, but is preferably not sought. For this reason, the content of multiply unsaturated monomers is preferably restricted to 20% by weight, based on component A), and is more preferably below 10% by weight, particularly preferably below 2% by weight, in particular below 0.5% by weight, or multiply unsaturated monomers are entirely omitted.

Multiply unsaturated monomers (crosslinkers) which can be successfully used for the purposes of the invention include, inter alia, ethylene glycol di(meth)acrylate and diethylene glycol di(meth)acrylate, triethylene glycol di(meth)acrylate and their higher homologues, 1,3- and 1,4-butanediol di(meth)acrylate, 1,6-hexanediol di(meth)acrylate, trimethylolpropane di(meth)acrylate or (meth)acrylates of ethoxylated trimethylolpropane, triallyl cyanurate and/or allyl (meth)acrylate.

Component A d)

The swelling resistance can also be controlled by incorporation of polar monomers such as methacrylamide or methacrylic acid into the emulsion polymer. The swelling resistance increases with increasing amount of methacrylamide or methacrylic acid.

Examples of further polar monomers are acrylic acid, acrylamide, acrylonitrile, methacrylonitrile, itaconic acid, maleic acid or N-methacryloyloxyethylethyleneurea and N-methacryloylamidoethylethyleneurea. N-methylolacrylamide or N-methacrylamide and their ethers are also conceivable as long as their proportion is limited so that despite crosslinking of the dispersion particles, they can be swelled sufficiently readily and initiation of the polymerization is not impaired.

The proportion of N-methylolacrylamide or N-methacrylamide should preferably not exceed 10% by weight, based on component A. Preference is given to a content below 5% by weight, particularly preferably below 2% by weight, in particular 0% by weight.

Further polar monomers are hydroxyethyl (meth)acrylate, hydroxypropyl (meth)acrylate, homologues of alkoxypolyethylene glycol methacrylate, of alkoxypolypropylene glycol methacrylate, of methacryloyloxypolyethylene and methacryloyloxypolypropylene glycol and of vinyloxypolyethylene and vinyloxypolypropylene glycol. All monomers mentioned can also be present in the form of mixed ethylene and propylene glycol repeating units. The degree of polymerization can be from 2 to 150, preferably from 2 to 25. Alkoxy radicals are first and foremost methyl, ethyl and butyl radicals. Relatively long alkyl chains, e.g. C18, are also possible but not preferred. Particular preference is given to a methyl radical.

The proportion of polar monomers depends first and foremost on the desired pot life of the formulation, but is also related to the glass transition temperature of the polymer. The lower the glass transition temperature, the higher the proportion of polar monomers required to achieve a particular swelling resistance. Furthermore, the proportion of polar monomers has to be matched to the solvent power of the monomers B used in the formulation.

In general, the proportion of polar monomers is in the range from 0% by weight to 20% by weight, preferably from 1% by weight to 10% by weight, particularly preferably from 2% by weight to 5% by weight, in particular from 3% by weight to 5% by weight, based on component A. If short pot lives, for example a few minutes, are desired or the solvent power of the monomers in component B is low, it can be advantageous to limit the content to less than 2% by weight or omit polar monomers entirely.

Methacrylamide and acrylamide and also methacrylic acid and acrylic acid are particularly effective and are therefore preferred when long pot lives are sought. A combination of methacrylamide or acrylamide with methacrylic acid or acrylic acid in weight ratios of from 3:1 to 1:3 is particularly preferred.

Component A e)

The component A e) which can be used successfully for the purposes of the invention corresponds to the general Formula I above.

For the purposes of the disclosure of the invention, a linear or branched alkanediyl group having from 1 to 18 carbon atoms is an unbranched or branched hydrocarbon radical having from 1 to 18 carbon atoms, e.g. the methandiyl (=methylene group), ethanediyl, propanediyl, 1-methylethanediyl, 2-methylpropanediyl, 1,1-dimethylethanediyl, pentanediyl, 2-methylbutanediyl, 1,1-dimethylpropanediyl, hexanediyl, heptanediyl, octanediyl, 1,1,3,3-tetramethylbutanediyl, nonanediyl, isononanediyl, decanediyl, undecanediyl, dodecanediyl or hexadecanediyl radical.

The term linear or branched alkyl radical having from 1 to 8 carbon atoms refers, for the purposes of the invention, to radicals such as the methyl, ethyl, propyl, 1-methylethyl, 2-methylpropyl, 1,1-dimethylethyl, pentyl, 2-methylbutyl, 1,1-dimethylpropyl, hexyl, heptyl, octyl, or 1,1,3,3-tetramethylbutyl radical.

The term linear or branched alkyl radical having from 1 to 12 carbon atoms refers, for the purposes of the invention, to radicals having from 1 to 8 carbon atoms as described above and also, for example, the nonyl, isononyl, decyl, undecyl or dodecyl radical.

The term $C_1$-$C_4$-alkoxy groups refers, for the purposes of the invention, to alkoxy groups in which the hydrocarbon radical is a branched or unbranched hydrocarbon radical having from 1 to 4 carbon atoms, e.g. the methyl, ethyl, propyl, 1-methylethyl, 2-methylpropyl or 1,1-dimethylethyl radical.

The term linear or branched alkoxy group having from 1 to 8 carbon atoms refers, for the purposes of the invention, to alkoxy groups in which the hydrocarbon radical is a branched or unbranched hydrocarbon radical having from 1 to 8 carbon atoms, e.g. the methyl, ethyl, propyl, 1-methylethyl, 2-methylpropyl, 1,1-dimethylethyl, pentyl, 2-methylbutyl, 1,1-dimethylpropyl, hexyl, heptyl, octyl, or 1,1,3,3-tetramethylbutyl radical.

As Formula (I) shows, the possible activator components A e) are generally (meth)acryloyl-functionalized amine derivatives. The activator or accelerator components are generally produced from modified amines, e.g. 2-N-(ethylanilino)ethanol or 2-N-(ethylanilino)propanol, which are converted into polymerizable accelerator/activator components, preferably by introduction of (meth)acrylate groups. Correspondingly, it is also possible to use, for example, m-toluidine and xylidine derivatives or further derivatives as starting material for producing the accelerator component.

Preferred activator/accelerator components A e) include, inter alia, the following classes of compounds: N-((meth)acryloyl(poly)oxyalkyl)-N-alkyl-(o,m,p)-(mono,di,tri,tetra,penta)alkylaniline, N-((meth)acryloyl(poly)oxyalkyl)-N-(arylalkyl)-(o,m,p)-(mono,di,tri,tetra,penta)alkylaniline, N-((meth)acryloyl(poly)oxyalkyl)-N-alkyl-(o,m,p)-(mono,di,tri,tetra,penta, etc.)alkylnaphthylamine, N-((meth)acrylamidoalkyl)-N-alkyl-(o,m,p)-(mono,di,tri,tetra,penta)alkylaniline. Examples of further amines are N,N-dimethylaminoethyl (meth)acrylate, diethylaminoethyl (meth)acrylate, 3-dimethylamino-2,2 dimethylpropyl (meth)acrylate, tert-butylaminoethyl (meth)acrylate, N-vinylimidazole and dimethylaminopropyl (meth)acrylamide. Preference is given to N((meth)acryloyloxyethyl)-N-methylaniline, N-((meth)acryloyloxypropyl)-N-methylaniline, N-((meth)acryloyloxypropyl)-N-methyl-(o,m,p)-toluidine, N-((meth)acryloyloxyethyl)-N-methyl-(o,m,p)-toluidine, N-((meth)acryloylpolyoxyethyl)N-methyl-(o,m,p)-toluidine. These materials are used individually or as mixtures of two or more of them.

Particularly advantageous emulsion polymers for the purposes of the invention are methacryloyl-functionalized substances, i.e. compounds of the Formula (I) in which $R^1$ is methyl.

In a further preferred embodiment, the polymers are characterized in that X in the Formula (I) is an ethanediyl, i.e. ethylene, group —$CH_2$—$CH_2$—.

In another particularly preferred embodiment, the emulsion polymer is characterized in that X in the Formula (I) is a hydroxyl-substituted propanediyl group, namely a 2-hydroxypropylene group —$CH_2$—CH(OH)—$CH_2$—.

Further preferred activators are obtained when the radical $R^2$ in the Formula (I) is selected from the group consisting of methyl, ethyl and 2-hydroxyethyl.

e1) preferably contains only one (meth) acryloyl group. It is possible, even though not preferred, for multiple unsaturation to be present as a result of partial esterification of the hydroxyl groups in $R^2$ with (meth)acrylic acid, which cannot always be entirely avoided in the synthesis. A quantity of such crosslinking structures is not critical as long as it does not impair the usability of the emulsion polymers A) in the two-component or multicomponent systems, for example due to now insufficient swellability of the emulsion polymer in component B) because the degree of crosslinking is too high. Typically, a proportion of multiply unsaturated activator monomer of less than 5% by weight, based on the polymer composition, is not necessarily prohibitive, but preference is given to less than 3% by weight, in particular less than 1% by weight. However, higher contents are not ruled out. A person skilled in the art can easily determine whether the monomer is suitable by, for example, experimentally determining whether an emulsion polymer A) prepared therewith initiates the polymerization in the desired time interval in the two-component or multicomponent system and whether the polymerization proceeds quickly and completely and the polymer has the desired properties.

Preference is likewise given to polymers in which one of the radicals $R^3$ to $R^7$ is methyl while the remaining four radicals are each hydrogen as activators.

Furthermore, polymers which are characterized in that two of the radicals $R^3$ to $R^7$ in the Formula (I) are each methyl while the remaining three radicals are each hydrogen are advantageous.

The proportion of the polymerizable activator A e) in component A can be from 0.1% by weight to 95% by weight. A very high proportion is preferably chosen, for example from 5% by weight to 60% by weight, particularly preferably 10% by weight-60% by weight, in particular 20% by weight-50% by weight. The upper limit is determined by the behaviour of the chosen activator in the emulsion polymerization. A person skilled in the art will make sure that the proportion is not so high that unacceptable amounts of coagulum are formed or excessively high residual amounts of monomer remain in the polymer. It is also possible for the specific activity of the activator to decrease as the amount incorporated increases. Since the polymerizable activator tends to be an expensive monomer component, a person skilled in the art will seek to find a compromise between a very high incorporated amount and good economics.

The emulsion polymer can also be a core-shell polymer. Here, a core-shell polymer is a polymer which has been prepared by a two-stage or multistage emulsion polymerization without the core-shell structure being shown by, for example, electron microscopy. If the polymerizable activator is incorporated only in the core, i.e. in the first stage, such a structure contributes to the activator being unavailable to the peroxide until swelling has occurred and premature polymerization thus being prevented. In one embodiment, the polar monomers are restricted to the shell, but core and shell otherwise have, disregarding the polymerizable activator in the core, the same structure. In another embodiment, core and shell can differ significantly in terms of the monomer composition, which has, for example, an effect on the respective glass transition temperature. In this case, it is advantageous for the glass transition temperature of the shell to be above that of the core, preferably above 60° C., particularly preferably above 80° C., in particular above 100° C. In addition, in this embodiment too, the polar monomers can be restricted to the shell. In general, a person skilled in the art will choose the more complex core-shell structure only when he can achieve advantageous properties as a result. The better protection of the activator against premature contact with the peroxide as a result of a shell can be the objective. The activator monomer is then preferably incorporated in the core. The objective can likewise be to make the cured monomers more flexible. In such cases, the core is given a relatively low glass transition temperature. The shell having the higher glass transition temperature then has the task of ensuring the desired swelling resistance and, if appropriate, isolation as solid. The weight ratio of core to shell depends on how well the activator is to be protected or what effects are expected as a result of this structure. In principle, it can be in the range from 1:99 to 99:1, i.e. it is generally not critical as long as the function of the emulsion polymer A, viz. to activate the polymerization of the two-component or multicomponent system in the desired way, is not adversely affected.

If the activator is to be protected by the shell, the proportion of shell will generally be restricted to the necessary dimension in order to make a high proportion of activator in the emulsion polymer possible.

If particular effects, e.g. flexiblization of the cured polymer systems by means of a core polymer having a low glass transition temperature, are to be achieved as a result of the structure, the core/shell ratio is matched to the desired effects. A person skilled in the art will usually set the proportion of shell to from 10% by weight to 50% by weight, preferably from 20% by weight to 40% by weight, in particular from 25% by weight to 35% by weight.

In this respect, the invention also provides a process for preparing an emulsion polymer according to the invention, in which the constituents a) to e) of the component A) are polymerized in aqueous emulsion.

The emulsion polymerization is carried out in a manner generally known to those skilled in the art. The way in which an emulsion polymerization is carried out is described by way of example in EP 0376096 B1.

Preference is given to choosing an initiator which does not form a redox system with the polymerizable activator A e). Suitable initiators are, for example, azo initiators such as the sodium salt of 4,4'-azobis(4-cyanovaleric acid).

The solid of the component A can be isolated from the dispersion by known methods. These include spray drying, freeze coagulation with suction filtration and drying and dewatering by means of an extruder. The polymer is preferably isolated by spray drying. If a certain amount of water does not interfere in the use, component A can also be added as aqueous dispersion to the system.

The molar mass of component A), expressed as weight average molecular weight $M_W$, influences the swelling resistance to a certain extent. High weight average molecular weights $M_W$ tend to increase the swelling resistance, while lower weight average molecular weights $M_W$ decrease it. The desired pot life is therefore, inter alia, a critical factor in deciding whether a person skilled in the art will choose a high molar mass or a rather lower one.

If no particular effects are to be achieved via the molar mass, a person skilled in the art will generally set the molar mass in the range from 10000 g/mol to 5000000 g/mol, preferably from 50000 g/mol to 1000000 g/mol and very particularly preferably from 100000 g/mol to 500000 g/mol. The molar mass is determined by means of gel permeation chromatography. The measurement is carried out in THF, and PMMA serves as calibration standard.

The swelling resistance can also be adjusted by choice of the particle size. The larger the particle diameter, the lower the swelling rate.

The primary particle size of component A is generally in the range from 50 nm to 2 microns, preferably from 100 nm to 600 nm and very particularly preferably from 150 nm to 400 nm. The particle size is measured by means of a Mastersizer 2000 Version 4.00.

If the process for preparing polymers according to the invention is carried out in the form of a core/shell polymerization process, it is, in view of what has been said above, particularly advantageous in terms of the invention for the constituents a) to e) to be polymerized as core in a first stage and a mixture of the constituents a) to d) subsequently to be polymerized as shell in at least one further stage. Particularly good encapsulation or masking of the activator component is achieved in this way.

In a particularly preferred variant of the process of the invention, the constituents a) to e) for the core and the constituents a) to d) for the shell are selected so that in the resulting polymer the glass transition temperature $T_{GS}$ of at least one shell is greater than the glass transition temperature $T_{GC}$ of the core, with the glass transition temperatures $T_G$ being determined in accordance with EN ISO 11357.

A further process modification provides for the constituents a) to d) for the shell to be selected so that in the resulting polymer the glass transition temperature $T_{GS}$ of at least one shell is greater than 80° C., preferably greater than 100° C., with the glass transition temperature $T_{GS}$ being determined in accordance with EN ISO 11357.

The emulsion polymerization can in principle be carried out as a batch polymerization or feed stream polymerization; a feed stream polymerization is preferred. It is likewise possible to prepare A) by means of a miniemulsion polymerization. The procedures are known to those skilled in the art.

Before use, the preferably spray-dried emulsion polymer A and the component C are suspended in a monomer or monomer mixture containing the components D, E and F. The suspended polymer is swelled by the monomer or monomers B within a particular period of time. The activator component fixed to the polymer thus becomes accessible for the peroxide and the polymerization reaction is started as a result.

It can be concluded from the long pot lives after mixing of the components that the activator fixed to the polymer is sufficiently well hidden away in the polymer particle. The rapid and large temperature rise at a particular point in time is surprising and shows that the process of the invention makes it possible to set a long pot life without impairing the later polymerization.

Component B: the Monomers

The pot life of the formulation comprising the components A, B, C, D, E and F) can be influenced by the swelling capability of the monomers used in component B. While methyl (meth)acrylate has a high swelling capability and thus leads to relatively short pot lives, more strongly hydrophobic monomers, for example 1,4-butanediol di(meth)acrylate, and monomers having a high molecular weight, for example ethyl triglycol (meth)acrylate, generally increase the pot life.

As monomers, it is in principle possible to use all methacrylate and acrylate monomers and styrene and their mixtures. Minor proportions of other monomers such as vinyl acetate, vinyl versatate, vinyloxypolyethylene glycol, maleic and fumaric acid and their anhydrides or esters are possible as long as they do not interfere in the copolymerization, but are not preferred. Criteria for the choice of the monomers are solvent power, polymerization shrinkage, adhesion to the substrate, vapour pressure, toxicological properties and odour. Examples of (meth)acrylates are methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, ethylhexyl (meth)acrylate, cyclohexyl (meth)acrylate, tetrahydrofurfuryl (meth)acrylate, isobornyl (meth)acrylate, benzyl (meth)acrylate, phenyl (meth)acrylate, phenylethyl (meth)acrylate, 3,3,5-trimethylcyclohexyl (meth)acrylate, hydroxyethyl (meth)acrylate, hydroxypropyl (meth)acrylate, methyl or ethyl triglycol methacrylate, butyl diglycol methacrylate, ethylene glycol di(meth)acrylate and diethylene glycol di(meth)acrylate, triethylene glycol di(meth)acrylate and their higher homologues, dipropylene glycol di(meth)acrylate, tripropylene glycol di(meth)acrylate and their higher homologues, 1,3- and 1,4-butanediol di(meth)acrylate, 1,6-hexanediol di(meth)acrylate, 1,12-dodecane-diol di(meth)acrylate, glycerol di(meth)acrylate, trimethylolpropane tri(meth)acrylate, trimethylolpropane di(meth)acrylate, the tri(meth)acrylate of an ethoxylated trimethylolpropane containing 3-10 mol of ethylene oxide, the di(meth)acrylate of an ethoxylated bisphenol A containing 2-20 mol of ethylene oxide, preferably 2-10 mol of ethylene oxide, and/or a polyethylene glycol dimethacrylate having 1-15 ethylene oxide units and allyl (meth)acrylate. Further examples are (meth)acrylic acid, (meth)acrylamide, N-methylol (meth)acrylamide, monoesters of maleic and succinic acids with hydroxyethyl methacrylate and the phosphoric ester of hydroxyethyl (meth)acrylate, whose proportion is usually minor.

For the component B), preference is given to, inter alia, one or more compounds selected from the group consisting of ethyl triglycol methacrylate, tetrahydrofurfuryl methacrylate, benzyl methacrylate, isobornyl methacrylate, 1,4-butanediol dimethacrylate, hydroxypropyl methacrylate, trimethylolpropane trimethacrylate, the trimethacrylate of an ethoxylated trimethylolpropane containing 3-10 mol of ethylene oxide, the dimethacrylate of an ethoxylated bisphenol A containing 2-10 mol of ethylene oxide and a polyethylene glycol dimethacrylate having 1-10 ethylene oxide units.

Particular preference is given to (meth)acrylates having a molecular weight above 140 g/mol, particularly preferably above 165 g/mol and in particular above 200 g/mol.

Methacrylates are preferred over acrylates for toxicological reasons.

Apart from long pot lives due to a lower swelling rate, monomers having a high molecular weight have the additional advantage of low emissions. On the other hand, their viscosity generally increases with the molar mass and the solvent power for the emulsion polymer drops, so that, particularly when polymers or oligomers are concomitantly used in appreciable proportions, a compromise has to be made.

Component C:

The peroxide is the partner of the activator in the redox system. Its proportion is generally in the range from 0.05% by weight to 10% by weight, preferably from 0.1% by weight to 5% by weight. A proportion of 0.5% by weight-5% by weight is usually chosen, preferably 0.5% by weight-3% by weight, in particular 0.5% by weight-2% by weight. A critical factor in choosing the proportion of peroxide is that, in the intended use, complete curing has to occur in the desired time and the cured system has to have properties appropriate for the application.

The peroxide is generally present in stabilized form in, for example, plasticizer or water or another medium. Typical peroxide contents of such peroxide formulations are 20% by weight-60% by weight. Possible peroxides are first and foremost, for example, dibenzoyl peroxide and dilauryl peroxide.

A further variant is to absorb the peroxide in an emulsion polymer (component C'). In a further embodiment of the invention, component C thus comprises an emulsion polymer containing a peroxide (component C'). The emulsion polymer of the component C' can have a structure identical to or different from the component A but without any polymerizable activator as comonomer. Typical peroxide contents of component C' are less than 20% by weight, in particular less than 10% by weight.

After all components have been mixed, the polymerization commences only when the polymer particles of the two components A and C' have been swelled.

It is generally not critical whether the emulsion polymers A and C' have identical or different compositions, as long as any incompatibility does not have an adverse effect.

Component D:

As oligomers, it is possible to use unsaturated polyesters and also polyurethane (meth)acrylates based on polyether diols, polyester diols or polycarbonate diols, and also mixtures of these. Furthermore, vinyl-terminated prepolymers based on acrylonitrile and butadiene can be used. It is also possible to use epoxide (meth)acrylates and also star-shaped copolymers as can be obtained, for example, by polymerization of (meth)acrylates in the presence of polyfunctional mercaptans.

The oligomers are preferably multiply unsaturated.

Polymers based on polyacrylates, polyesters, polyethers, polycarbonates or the corresponding copolymers can also be used. These can be either saturated or unsaturated. The mixing ratio and the amount used depend on the desired application. The polymers and their proportion are generally selected so that the viscosity of the mixture is not adversely affected.

The molar mass of the unsaturated oligomers is typically from 500 to 20000 g/mol, in particular from 1000 to 5000 g/mol. Saturated polymers typically have molar masses above 20000 g/mol, for example 50000-200000 g/mol. The molar masses are in all cases weight average molecular weights.

Component E):

The polymerization inhibitor is required to ensure sufficient storage stability of the mixture of the components B), D), E) and F). The mode of action of the inhibitors is usually that they act as free-radical scavengers for the free radicals occurring during the polymerization. Further details may be found in the relevant specialist literature, in particular Römpp-Lexikon Chemie; Editors: J. Falbe, M. Regitz; Stuttgart, New York; 10th Edition (1996); keyword "Antioxidantien", and the references cited there. Suitable inhibitors encompass, inter alia, substituted or unsubstituted phenols, substituted or unsubstituted hydroquinones such as hydroquinone monomethyl ether (HQME), substituted or unsubstituted quinones, substituted or unsubstituted catechols, tocopherol, tert-butylmethoxyphenol (BHA), butylhydroxytoluene (BHT), octyl gallate, dodecyl gallate, ascorbic acid, substituted or unsubstituted aromatic amines, substituted or unsubstituted metal complexes of an aromatic amine, substituted or unsubstituted triazines, organic sulphides, organic polysulphides, organic dithiocarbamates, organic phosphites and organic phosphonates, phenothiazine and 4-hydroxy-2,2,6,6-tetramethylpiperidin-1-oxyl.

Substituted and unsubstituted hydroquinones and substituted or unsubstituted phenols are preferably used. Particular preference is given to hydroquinone, hydroquinone monomethyl ether and 4-methyl-2,6-di-tert-butylphenol.

0.2% by weight of inhibitor is generally sufficient, and the proportion is usually significantly lower, for example 0.05% by weight or less. The pot life of the system after mixing in of the components A and C is, according to the invention, controlled via the swelling of the component A. Proportions of more than 0.2% by weight of inhibitor, e.g. 1% by weight or higher, which are sometimes used to increase the pot life of systems of the prior art, are therefore usually not necessary, but should not be ruled out. A content of not more than 0.2% by weight is preferred, in particular not more than 0.05% by weight.

Component F:

In addition to the components described, the formulation can contain customary particulate fillers such as titanium dioxide, carbon black or silicon dioxide, glass, glass beads, glass powder, cement, silica sand, quartz flour, sand, corundum, stoneware, klinker, barite, magnesia, calcium carbonate, ground marble or aluminium hydroxide, mineral or organic pigments and auxiliaries.

Auxiliaries can be, for example: plasticizers, water, levelling agents, thickeners, antifoams, bonding agents or wetting agents. Preference is given to no further plasticizer apart from any plasticizer used for stabilizing the peroxide being used.

The particulate fillers usually have a particle diameter of from about 0.001 mm to about 6 mm.

It is usual to use from 0 to 8 parts by weight of fillers per part by weight of polymer.

The Mixing Ratio

The mixing ratio is dependent on the intended use. This determines the amount of the components A-F used. The mixing ratio of the components used is preferably selected so that complete polymerization of the given system is achieved. In particular, it is advantageous for a sufficient amount of a redox initiator system to be available, with the activator being made available at least predominantly in the form of an emulsion polymer (component A).

Since the proportion of the polymerizable activator A e) in component A can be selected within wide limits, there is also broad latitude for the amount of component A used. Thus, the proportion of component A can be in the range from 0.8 to 69.94% by weight and even from 0.1 to 95% by weight of the polymerizable activator. In general, the amount of activator is matched to the proportion of peroxide used. The peroxide is the partner of the activator in the redox system. Its proportion is generally in the range from 0.05% by weight to 10% by weight, preferably from 0.1% by weight to 5% by weight. A proportion of 0.5% by weight-5% by weight is usually chosen, preferably 0.5% by weight-3% by weight, in particular 0.5% by weight-2% by weight. A critical factor determining the proportion of peroxide and the proportion of component A is that, in the intended use, complete polymerization to the desired extent has to occur in the desired time and the cured system has to give the performance required for the application.

The proportion of an ethylenically unsaturated monomer (component B) can be in the range from 30% by weight to 99% by weight. It is preferably 40% by weight-90% by weight, in particular 40% by weight-80% by weight. The proportion of an oligomer or polymer (component D) is 0% by weight-60% by weight, preferably 0% by weight-40% by weight, in particular 0% by weight-30% by weight.

Furthermore, the mixture can contain from 0 to 800 parts by weight, based on the sum of A–D=100 parts by weight, of fillers, pigments and other auxiliaries.

Preferred Two-Component or Multicomponent Systems According to the Invention Encompass A) 0.8% by weight–69.94% by weight of a polymer as described above having an activator component fixed to it;
B) 30% by weight–99.14% by weight of one or more ethylenically unsaturated monomers;
C) 0.05% by weight–10% by weight of peroxide; if appropriate
D) 0% by weight–60% by weight of oligomers;
E) 0.01% by weight–2% by weight of a polymerization inhibitor; and, if appropriate,
F) 0±800 parts by weight of auxiliaries and additives;
with the sum of the constituents A)+B)+C)+D)+E) being 100% by weight and the amount of F) being based on 100 parts by weight of the sum of A)+B)+C)+D)+E).

Preference is also given to systems containing from 5 to 45% by weight of component A),
from 40% by weight to 94.89% by weight of component B),
from 0.1% by weight to 5% by weight of component C),
0% by weight–30% by weight of component D),
0.01% by weight–0.2% by weight of component E)
and
from 0 to 800 parts by weight of component F),
with the sum of the constituents A)+B)+C)+D)+E) being 100% by weight and the amount of F) being based on 100 parts by weight of the sum of A)+B)+C)+D)+E).

Even greater preference is given to systems containing
from 5% by weight to 45% by weight of component A),
from 50% by weight to 94.50% by weight of component B),
from 0.5% by weight to 5% by weight of component C),
0% by weight of component D)
and
from 0 to 800 parts by weight of component F),
with the sum of the constituents A)+B)+C)+D)+E) being 100% by weight and the amount of F) being based on 100 parts by weight of the sum of A)+B)+C)+D)+E).

The content of the component D) is particularly preferably 0% by weight.

Systems in which the component A) is present in liquid form are also of interest in the context of the invention. This makes mixing of the individual components before use easier. Thus, component A can be used as aqueous dispersion as is obtained by emulsion polymerization without isolation of the polymer or can subsequently be resuspended in water. Such use forms require that water in the amount introduced into the system does not interfere.

If water has to be avoided, it can also be advantageous for the purposes of the invention to obtain storage-stable liquid or paste-like formulations of component A by use of a monomer which does not swell or a mixture of monomers which do not swell as part of the component B. For the present purposes, storage stable means that any viscosity increase is sufficiently small for mixing of all components before use to be possible.

Systems in which peroxide C) and amine activator components (encapsulated in the polymer A) are present side by side are also of particular interest in the context of the invention. This is surprising since such initiator components would generally have to be stored separately from one another before use.

In a particularly advantageous embodiment, the invention provides a system which is characterized in that component A) and component C) are stored together and at least one constituent of the component B) is stored separately from A) and C) until the system is used, with the swelling capability of the separately stored constituent of the component B) for the polymer A) being so high that the activator fixed to the polymer A) can react with the component C).

Such a system is prepared by mixing a peroxide, usually benzoyl peroxide, into an aqueous polymer dispersion in which a polymerizable activator component is encapsulated in the polymer, preferably by means of a core/shell structure. The system comprising an aqueous dispersion containing an encapsulated, polymer-bonded activator component and a peroxidic initiator present in the aqueous phase is thus storage-stable since contact with peroxide and amine is prevented. To utilize such a storage-stable initiator system for polymerization, swelling of the polymer particles by means of suitable monomers is brought about.

For the purposes of the invention it can also be advantageous to achieve storage stability of the two-component or multicomponent system not by means of the aqueous phase but instead by use of a nonswelling monomer or a mixture of nonswelling monomers. The nonswelling monomers are part of the component B.

A particular system according to the invention is characterized in that component A), part of component B) and component C) are stored together, with the proportion of the component B) being selected so that the swelling capability of these constituents of the component B) for the polymer A) is so low that the activator fixed to the polymer A) cannot react with the component C). However, it is important that the swelling capability of the totality of the monomers of the component B after mixing of all components is sufficiently high to trigger the polymerization of the system.

Such a system is prepared, for example, by isolating the above-described emulsion polymers, preferably by spray drying. The polymer A) which is obtained as a solid and in which the fixed activator component is encapsulated is subsequently dispersed in a monomer which does not swell or does not dissolve the polymer. One or more peroxides C), preferably, for example, benzoyl peroxide, are mixed into this mixture in which a polymerizable activator component is encapsulated in the polymer. The bonding to the polymer virtually rules out possible surface loading of the polymer particle with the activator. The system comprising, preferably, a core/shell polymer containing an encapsulated, polymer-bonded activator component and an initiator present in the nonswelling monomer phase is therefore storage-stable since contact between component C) and activator in the polymer A) is prevented.

To utilize such a storage-stable initiator system for polymerization, swelling of the polymer particles by means of suitable monomers, which are then added to the system, is brought about. The activator component is liberated and curing of this mixture including the nonswelling monomers becomes possible. The swelling resistance can be set, in particular, as described above.

Uses:

The system is in principle suitable for all two-component systems such as adhesives, pourable resins, floor coatings and other reactive coatings, sealing compositions, impregnation compositions, embedding compositions, reactive pegs, dental compositions, the production of artificial marble or other artificial stones, porous plastic moulds for ceramic objects and similar applications. It is also suitable for use in unsaturated polyester resins and their typical applications.

Particular preference is given to the use of the two-component or multicomponent system described in adhesives, pourable resins, floor coatings, compositions for reactive pegs, dental compositions or sealing compositions.

In a use as pourable resin, a high proportion of polymer (component A), for example in the range from 30% by weight to 70% by weight, can be advantageous. The proportion of activator in component A can then be restricted, for example, to from 0.1% by weight to 5% by weight, based on the component A. The components B and D together then make up from 69.9% by weight to 30% by weight. The proportion of peroxide is preferably from 0.1% by weight to 5% by weight.

In the field of highly crosslinked systems, it can be useful to limit the content of polymer (component A) and use it only as support for an activator. The proportion of the component A is therefore preferably correspondingly low and is, for example, in the range from 1% by weight to 10% by weight. The proportion of the activator fixed in component A is made correspondingly high and can be 10% by weight or even up to 60% by weight, in individual cases also up to 95% by weight, based on component A. The components B and D together are then in the range from 98.9 to 90% by weight. The proportion of peroxide is preferably from 0.1% by weight to 5% by weight.

The following examples and comparative examples serve to illustrate the invention.

Preparation of the Emulsion Polymers

All emulsion polymers were prepared by the feed stream process.

The initial charge was stirred in the reaction vessel at 80° C. for 5 minutes. The remaining feed stream 1 was then added over a period of 3 hours and feed stream 2 was added over a period of 1 hour. Feed streams 1 and 2 were emulsified before addition to the reaction mixture. Demineralized water was used.

The batches are shown in Table 1.

TABLE 1

| Experiment No. | Initial charge | Feed stream 1 | Feed stream 2 | Characterization |
|---|---|---|---|---|
| 1 | 341.0 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4'-azobis(4-cyanovaleric acid), Na salt solution<br>400.0 g of MMA<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 38.8%<br>average particle size, Mastersizer: 158 nm<br>pH: 6.1 |
| 2 | 341.0 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4' azobis(4-cyanovaleric acid), Na salt solution<br>396.0 g of MMA<br>4.13 g of 2-N-(ethylanilino)ethyl methacrylate<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 39.0%<br>average particle size, Mastersizer: 171 nm<br>pH: 6.1 |
| 3 | 341.5 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4'-azobis(4-cyanovaleric acid), Na salt solution<br>392.0 g of MMA<br>8.20 g of 2-N-(ethylanilino)ethyl methacrylate<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 38.7%<br>average particle size, Mastersizer: 176 nm<br>pH: 6.0 |
| 4 | 341.0 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4'-azobis(4-cyanovaleric acid), Na salt solution<br>388.0 g of MMA<br>12.38 g of 2-N-(ethylanilino)ethyl methacrylate<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 38.9%<br>average particle size Mastersizer: 189 nm<br>pH: 6.1 |

TABLE 1-continued

| Experiment No. | Initial charge | Feed stream 1 | Feed stream 2 | Characterization |
|---|---|---|---|---|
| 5 | 341.0 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4'-azobis(4-cyanovaleric acid), Na salt solution<br>384.0 g of MMA<br>16.50 g of 2-N-(ethylanilino)ethyl methacrylate<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 38.6%<br>average particle size, Mastersizer:<br>167 nm<br>pH: 5.9 |
| 6 | 342.2 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4'-azobis(4-cyanovaleric acid), Na salt solution<br>376.0 g of MMA<br>24.80 g of 2-N-(ethylanilino)ethyl methacrylate<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 39.1%<br>average particle size, Mastersizer:<br>183 nm<br>pH: 6.1 |
| 7 | 342.2 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4'-azobis(4-cyanovaleric acid), Na salt solution<br>368.0 g of MMA<br>33.03 g of 2-N-(ethylanilino)ethyl methacrylate<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 39.0%<br>average particle size, Mastersizer:<br>165 nm<br>pH: 6.3 |
| 8 | 342.2 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4'-azobis(4-cyanovaleric acid), Na salt solution<br>360.0 g of MMA<br>41.30 g of 2-N-(ethylanilino)ethyl methacrylate<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 38.8%<br>average particle size, Mastersizer:<br>236 nm<br>pH: 6.0 |
| 9 | 343.9 g of water<br>0.72 g of 10% strength C15-paraffinsulphonate, Na salt solution<br>6.0 g of 10% strength 4,4'-azobis(4-cyanovaleric acid), Na salt solution | 12.0 g of 10% strength C15-paraffinsulphonate, Na salt solution<br>24.0 g of 10% strength 4,4'-azobis(4-cyanovaleric acid), Na salt solution<br>340.0 g of MMA<br>62.40 g of 2-N-(ethylanilino)ethyl methacrylate<br>400.0 g of water | 12.0 g of 10% strength C15-paraffinsulphonate, Na salt solution<br>24.0 g of 10% strength 4,4'-azobis(4-cyanovaleric acid), Na salt solution<br>380.0 g of MMA<br>20.0 g of MAA<br>400.0 g of water | SC: 38.7%<br>average particle size, Mastersizer:<br>198 nm<br>pH: 6.1 |

TABLE 1-continued

| Experiment No. | Initial charge | Feed stream 1 | Feed stream 2 | Characterization |
|---|---|---|---|---|
| 10 | 262.5 g of water 0.54 g of 10% strength C15-paraffinsulphonate, Na salt solution 4.5 g of 10% strength 4,4'-azobis(4-cyanovaleric acid), Na salt solution | 9.0 g of 10% strength C15-paraffinsulphonate, Na salt solution 18.0 g of 10% strength 4,4'-azobis(4-cyanovaleric acid), Na salt solution 240.0 g of MMA 62.10 g of 2-N-(ethylanilino)ethyl methacrylate 300.0 g of water | 9.0 g of 10% strength C15-paraffinsulphonate, Na salt solution 18.0 g of 10% strength 4,4'-azobis(4-cyanovaleric acid), Na salt solution 285.0 g of MMA 15.0 g of MAA 300.0 g of water | SC: 38.7% average particle size, Mastersizer: 289 nm pH: 5.3 |
| 11 | 263.4 g of water 0.54 g of 10% strength C15-paraffinsulphonate, Na salt solution 4.5 g of 10% strength 4,4'-azobis(4-cyanovaleric acid), Na salt solution | 9.0 g of 10% strength C15-paraffinsulphonate, Na salt solution 18.0 g of 10% strength 4,4'-azobis(4-cyanovaleric acid), Na salt solution 225.0 g of MMA 77.60 g of 2-N-(ethylanilino)ethyl methacrylate 300.0 g of water | 9.0 g of 10% strength C15-paraffinsulphonate, Na salt solution 18.0 g of 10% strength 4,4'-azobis(4-cyanovaleric acid), Na salt solution 285.0 g of MMA 15.0 g of MAA 300.0 g of water | SC: 38.0% average particle size, Mastersizer: 283 nm pH: 5.2 |
| 12 | 264.1 g of water 0.54 g of 10% strength C15-paraffinsulphonate, Na salt solution 4.5 g of 10% strength 4,4'-azobis(4-cyanovaleric acid), Na salt solution | 9.0 g of 10% strength C15-paraffinsulphonate, Na salt solution 18.0 g of 10% strength 4,4'-azobis(4-cyanovaleric acid), Na salt solution 210.0 g of MMA 93.1 g of 2-N-(ethylanilino)ethyl methacrylate 300.0 g of water | 9.0 g of 10% strength C15-paraffinsulphonate, Na salt solution 18.0 g of 10% strength 4,4'-azobis(4-cyanovaleric acid), Na salt solution 285.0 g of MMA 15.0 g of MAA 300.0 g of water | SC: 38.9% average particle size, Mastersizer: 340 nm pH: 6.8 |
| 13 | 264.9 g of water 0.54 g of 10% strength C15-paraffinsulphonate, Na salt solution 4.5 g of 10% strength 4,4'-azobis(4-cyanovaleric acid), Na salt solution | 9.0 g of 10% strength C15-paraffinsulphonate, Na salt solution 18.0 g of 10% strength 4,4'-azobis(4-cyanovaleric acid), Na salt solution 195.0 g of MMA 108.0 g of 2-N-(ethylanilino)ethyl methacrylate 300.0 g of water | 9.0 g of 10% strength C15-paraffinsulphonate, Na salt solution 18.0 g of 10% strength 4,4'-azobis(4-cyanovaleric acid), Na salt solution 285.0 g of MMA 15.0 g of MAA 300.0 g of water | SC: 39.3% average particle size, Mastersizer: 161 nm pH: 5.2 |
| 14 | 177.05 g of water 0.36 g of 10% strength C15-paraffinsulphonate, Na salt solution 3.0 g of 10% strength 4,4'-azobis(4-cyanovaleric acid), Na salt solution | 6.0 g of 10% strength C15-paraffinsulphonate, Na salt solution 12.0 g of 10% strength 4,4'-azobis(4-cyanovaleric acid), Na salt solution 120.0 g of MMA 82.70 g of 2-N-(ethylanilino)ethyl methacrylate 200.0 g of water | 6.0 g of 10% strength C15-paraffinsulphonate, Na salt solution 12.0 g of 10% strength 4,4'-azobis(4-cyanovaleric acid), Na salt solution 190.0 g of MMA 10.0 g of MAA 200.0 g of water | SC: 38.7% average particle size, Mastersizer: 173 nm pH: 5.3 |

TABLE 1-continued

| Experiment No. | Initial charge | Feed stream 1 | Feed stream 2 | Characterization |
|---|---|---|---|---|
| 15 | 177.6 g of water 0.36 g of 10% strength C15-paraffinsulphonate, Na salt solution 3.0 g of 10% strength 4,4'-azobis(4-cyanovaleric acid), Na salt solution | 6.0 g of 10% strength C15-paraffinsulphonate, Na salt solution 12.0 g of 10% strength 4,4'-azobis(4-cyanovaleric acid), Na salt solution 110.0 g of MMA 93.10 g of 2-N-(ethylanilino)ethyl methacrylate 200.0 g of water | 6.0 g of 10% strength C15-paraffinsulphonate, Na salt solution 12.0 g of 10% strength 4,4'-azobis(4-cyanovaleric acid), Na salt solution 190.0 g of MMA 10.0 g of MAA 200.0 g of water | SC: 38.7% average particle size, Mastersizer: 164 nm pH: 5.4 |
| 16 | 260.1 g of water 0.54 g of 10% strength C15-paraffinsulphonate, Na salt solution 4.5 g of 10% strength 4,4'-azobis(4-cyanovaleric acid), Na salt solution | 9.0 g of 10% strength C15-paraffinsulphonate, Na salt solution 18.0 g of 10% strength 4,4'-azobis(4-cyanovaleric acid), Na salt solution 210.0 g of MMA 92.9 g of 2-N-(ethylanilino)ethyl methacrylate 300.0 g of water | 9.0 g of 10% strength C15-paraffinsulphonate, Na salt solution 18.0 g of 10% strength 4,4'-azobis(4-cyanovaleric acid), Na salt solution 285.0 g of MMA 15.0 g of MA amide 300.0 g of water | SC: 38.2% average particle size, Mastersizer: 229 nm pH: 6.1 |
| 17 | 260.1 g of water 0.54 g of 10% strength C15-paraffinsulphonate, Na salt solution 4.5 g of 10% strength 4,4'-azobis(4-cyanovaleric acid), Na salt solution | 9.0 g of 10% strength C15-paraffinsulphonate, Na salt solution 18.0 g of 10% strength 4,4'-azobis(4-cyanovaleric acid), Na salt solution 210.0 g of MMA 92.9 g of 2-N-(ethylanilino)ethyl methacrylate 300.0 g of water | 9.0 g of 10% strength C15-paraffinsulphonate, Na salt solution 18.0 g of 10% strength 4,4'-azobis(4-cyanovaleric acid), Na salt solution 270.0 g of MMA 15.0 g of MA amide 15.0 g of MAA 300.0 g of water | SC: 39.0% average particle size, Mastersizer: 255 nm pH: 5.5 |
| 18 | 260.1 g of water 0.54 g of 10% strength C15-paraffinsulphonate, Na salt solution 4.5 g of 10% strength 4,4'-azobis(4-cyanovaleric acid), Na salt solution | 9.0 g of 10% strength C15-paraffinsulphonate, Na salt solution 18.0 g of 10% srength 4,4'-azobis(4-cyanovaleric acid), Na salt solution 210.0 g of MMA 92.9 g of 2-N-(ethylanilino)ethyl methacrylate 300.0 g of water | 9.0 g of 10% strength C15-paraffinsulphonate, Na salt solution 18.0 g of 10% strength 4,4'-azobis(4-cyanovaleric acid), Na salt solution 285.0 g of MMA 15.0 g of MAA 300.0 g of water | SC: 39.1% average particle size, Mastersizer: 227 nm pH: 5.3 |

Abbreviations used in Table 1:
MMA: Methyl methacrylate
MAA: Methacrylic acid
SC: Solids content Preparation of a Monomer/Polymer Mixture and Determination of the Swelling Time 20 g (=40% by weight) of the respective polymer (component A) are placed in a beaker (0.2 l). 30 g (=60% by weight) of an ethylenically unsaturated monomer or monomer mixture (component B) are added and the mixture is stirred with a wooden spatula until it is considered to be no longer processable. This time is reported as the swelling time or pot life.

The results are shown in Table 2. The experiments without curing show how the swelling resistance can be increased by incorporation of polar monomers.

Gelling Time Measurement Using the GELNORM-Gel Timer
Description of Instrument:

The GELNORM Gel Timer is an automatic instrument for determining the gelling time of reactive resins by a method based on DIN 16945, part 1, and DIN 16916.

Instrument Construction:

Clamping holder, knurled screw, measurement punch, microswitch, holding spring, test tube, test tube holder
Procedure:

A mixture of 5 g of powder and 7.5 g of monomer was prepared. The mixture was stirred with a wooden spatula for about 1 minute and introduced into a 160 mm×16 mm diameter test tube (tare: about 10 g). The total weight of test tube and test mixture should always be 22 g in order to ensure good reproducibility of the measurement results.

The test tube including holding spring and test mixture was placed in the holder of the measurement head and the holding spring was at the same time hooked onto the microswitch. The measurement punch was subsequently dipped into the mixture and fastened at the clamping holder. The experiment was then started at room temperature.

On reaching the gelling point, the time measurement was stopped by means of the microswitch by drawing up the test tube. The instrument has a reading precision of one second.

TABLE 2

| Experiment No. | Composition | | Monomer component | Swelling time [min] | Gelling time [min] | Polymerization time [min] | Peak temp. [° C.] |
|---|---|---|---|---|---|---|---|
| | Core: 50% | Shell: 50% | | | | | |
| 1 | 100% of MMA | 95% of MMA 5% of MAA | THFMA | 31 | 17 | — | — |
| 2 | 99% of MMA 1% of 2-(N-ethylanilino)ethyl methacrylate | 95% of MMA 5% of MAA | THFMA | 20 | 13 | 144 | 26.5 |
| 3 | 98% of MMA 2% of 2-(N-ethylanilino)ethyl methacrylate 2-(N-ethylanilino)ethyl methacrylate | 95% of MMA 5% of MAA | THFMA | 24 | 37 | 1440 | 24 |
| 4 | 97% of MMA 3% of 2-(N-ethylanilino)ethyl methacrylate | 95% of MMA 5% of MAA | THFMA | 30 | 47 | 215 | 47 |
| 5 | 96% of MMA 4% of 2-(N-ethylanilino)ethyl methacrylate | 95% of MMA 5% of MAA | THFMA | 50 | 38 | 130 | 61 |
| 6 | 94% of MMA 6% of 2-(N-ethylanilino)ethyl methacrylate | 95% of MMA 5% of MAA | THFMA | 34 | 43 | 101 | 68 |
| 7 | 92% of MMA 8% of 2-(N-ethylanilino)ethyl methacrylate | 95% of MMA 5% of MAA | THFMA | 30 | 38 | 79 | 70 |
| 8 | 90% of MMA 10% of 2-(N-ethylanilino)ethyl methacrylate | 95% of MMA 5% of MAA | THFMA | 60 | 19 | 123 | 80 |
| 9 | 85% of MMA 15% of 2-(N-ethylanilino)ethyl methacrylate | 95% of MMA 5% of MAA | THFMA | 60 | 17 | 98 | 97 |
| 10 | 80% of MMA 20% of 2-(N-ethylanilino)ethyl methacrylate | 95% of MMA 5% of MAA | THFMA | 60 | 39 | 60 | 99 |
| 11 | 75% of MMA 25% of 2-(N-ethylanilino)ethyl methacrylate | 95% of MMA 5% of MAA | THFMA | 36 | 52 | 66 | 102 |

TABLE 2-continued

| Experiment No. | Composition | Monomer component | | Swelling time [min] | Gelling time [min] | Polymerization time [min] | Peak temp. [° C.] |
|---|---|---|---|---|---|---|---|
| 12 | 70% of MMA 30% of 2-(N-ethylanilino)ethyl methacrylate | 95% of MMA 5% of MAA | THFMA | 43 | 63 | 73 | 112 |
| 13 | 65% of MMA 35% of 2-(N-ethylanilino)ethyl methacrylate | 95% of MMA 5% of MAA | THFMA | 15 | 21 | 35 | 116 |
| 14 | 60% of MMA 40% of 2-(N-ethylanilino)ethyl methacrylate | 95% of MMA 5% of MAA | THFMA | 12 | 22 | 26 | 114 |
| 15 | 55% of MMA 45% of 2-(N-ethylanilino)ethyl methacrylate | 95% of MMA 5% of MAA | THFMA | 21 | 20 | 46 | 111 |
| 16 | 70% of MMA 30% of 2-(N-ethylanilino)ethyl methacrylate | 95% of MMA 5% of MA amide | THFMA | 125 | not measurable | 188 | 80 |
| 17 | 70% of MMA 30% of 2-(N-ethylanilino)ethyl methacrylate | 95% of MMA 5% of MA amide 5% of MAA | THFMA | >450 | not measurable | >450 | 22 |
| 18 | 70% of MMA 30% of 2-(N-ethylanilino)ethyl methacrylate | 95% of MMA 5% of MAA | THFMA | 61 | 61' | 90 | 100 |
| 19 | 70% of MMA 30% of 2-(N-ethylanilino)ethyl methacrylate | 98% of MMA 2% of MAA | 1,4-BDDMA:HPMA = 1:1 | 20 | 36 | 24 | 144 |

Abbreviations used in Table 2:
MMA: Methyl methacrylate
MAA: Methacrylic acid
MA amide: Methacrylamide
THFMA: Tetrahydrofurfuryl methacrylate
1,4-BDDMA: 1,4-butanediol dimethacrylate
HPMA: Hydroxypropyl methacrylate Curing of Thin Films:

Procedure: 5 g of the respective polymer (component A) are placed in a beaker (0.2 l) and admixed with various amounts of MMA. The mixtures were in each case admixed with 1.3 g of BP-50-FT.

The following mixing ratios were examined:

| Polymer (Component A) | Methyl methacrylate | Mixing ratio (% by weight/ % by weight) | BP-50-FT |
|---|---|---|---|
| 5 g | 11.65 g | 30:70 | 1.3 g |
| 5 g | 15.00 g | 25:75 | 1.3 g |
| 5 g | 20.00 | 20:80 | 1.3 g |

The mixtures produced were spread to form a film by means of a doctor blade. The layer thickness varied in the range from 0.85 mm to 0.07 mm. The curing of the films was carried out in air and was complete within 60 minutes.

Determination of the Polymerization Times:

Polymerization method: Benzoyl peroxide BP-50-FT (BP-50-FT is a white free-flowing powder containing 50% by mass of dibenzoyl peroxide and stabilized with a phthalic ester) is mixed in amounts aquimolar to the activator with the monomers B and component A.

All polymerizations were carried out at the same mixing ratio as described above for the determination of the pot life.

The polymerization time is defined as the time from the commencement of polymerization (addition of the initiators) which a batch requires to reach the polymerization peak temperature. The result is reported as the time required and the peak temperature. The measurement is carried out by means of a contact thermometer with recording of the temperature profile.

The invention claimed is:

1. An emulsion polymer obtained by a process comprising polymerizing a mixture comprising
    a) from 5 to 99.9% by weight of one or more monomers having a solubility in water of <2% by weight at 20° C. and selected from the group consisting of monofunctional (meth)acrylate monomers, styrene and vinyl esters;
    b) from 0 to 70% by weight of one or more monomers copolymerized with the one or more monomers a);
    c) from 0 to 20% by weight of one or more doubly or multiply vinylically unsaturated compounds;
    d) from 0 to 20% by weight of one or more polar monomers having a solubility in water of >2% by weight at 20° C.; and
    e) 0.1-95% by weight of at least one activator,
    wherein the sum of a) to e) is 100% by weight of the polymerizable constituents of the mixture, e1) the activator is a compound of Formula I,

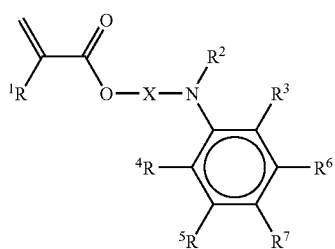

(I)

wherein

R$^1$ is hydrogen or methyl;

X is a 2-hydroxypropylene group —CH$_2$—CH(OH)—CH$_2$—;

R$^2$ is hydrogen or a linear or branched alkyl radical which has from 1 to 12 carbon atoms and is optionally mono-substituted or polysubstituted by hydroxyl groups or C$_1$-C$_4$-alkoxy groups, with the hydroxyl groups optionally partially esterified with (meth)acrylic acid; and R$^3$, R$^4$, R$^5$, R$^6$ and R$^7$ are each, independently of one another, hydrogen or a linear or branched alkyl or alkoxy group which has from 1 to 8 carbon atoms and are optionally monosubstituted or polysubstituted by hydroxyl groups, where two of the radicals R$^3$ to R$^7$ may be joined to one another to form a five- to seven-membered ring and optionally form a fused aromatic ring system with the phenyl radical, and e2) the activator e) is covalently bound to the emulsion polymer.

2. The emulsion polymer according to claim 1, wherein R$^1$ is methyl.

3. The emulsion polymer according to claim 1, wherein R$^2$ is selected from the group consisting of methyl, ethyl and 2-hydroxyethyl.

4. The emulsion polymer according to claim 1, wherein one of the radicals R$^3$ to R$^7$ is methyl while the remaining four radicals are each hydrogen.

5. The emulsion polymer according to claim 1, wherein two of the radicals R$^3$ to R$^7$ are each methyl while the remaining three radicals are each hydrogen.

6. The emulsion polymer according to claim 1, wherein a) comprises at least one of methacrylate monomer and acrylate monomer.

7. The emulsion polymer according to claim 1, wherein e) is present in an amount of 10-60% by weight.

8. The emulsion polymer according to claim 5, wherein a) is methyl methacrylate.

* * * * *